Dec. 24, 1929.  G. WEIS  1,740,756
POWER TRANSMISSION GEAR
Filed Feb. 12, 1929
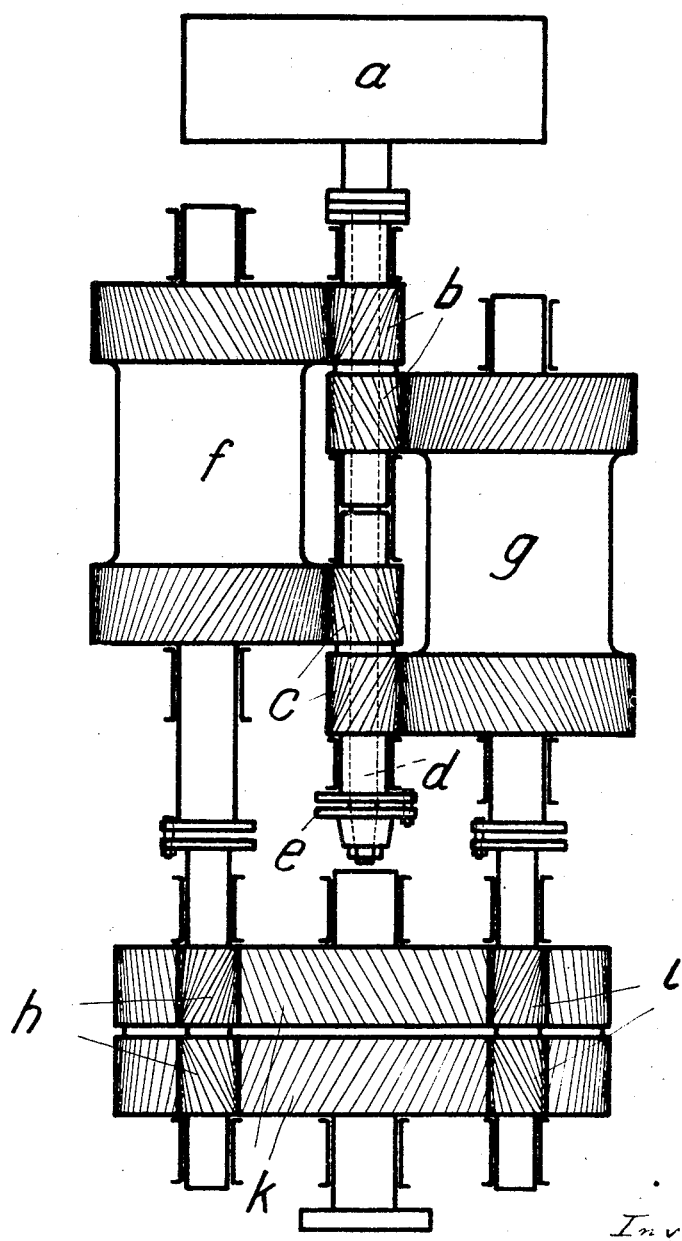

Patented Dec. 24, 1929

1,740,756

UNITED STATES PATENT OFFICE

GABRIEL WEIS, OF BREMEN-HORN, GERMANY, ASSIGNOR TO DEUTSCHE SCHIFF- UND MASCHINENBAU AKTIENGESELLSCHAFT, OF BREMEN, GERMANY, A CORPORATION OF GERMANY

POWER-TRANSMISSION GEAR

Application filed February 12, 1929, Serial No. 339,390, and in Germany October 26, 1926.

The present invention relates to a power transmission gear for transmitting large forces from a power source to a driven shaft wherein in order to reduce the size and weight of the transmission members the driving force is transmitted in a distributed form.

One object of this invention is to provide means for equalizing the tooth pressure in such a gear without using interposed flexible shafts or intermediate members which were hitherto customary for this purpose.

A further object of this invention is to ensure that the torque is transmitted equally to the final transmission members so that such members are not distorted.

Further objects are the elimination of axial thrust by opposing the axial components, the elimination of the necessity for pressure bearings for the gear shafts and a design of transmission gear which is particularly favourable for accurate machining of the gear teeth.

In one form of construction according to the invention the driving force is transmitted directly in halves each to one of two helically toothed pinions which are arranged in line on the same axis and are axially movable independently of each other, which pinions work with oppositely directed axial components on two axially movable helically toothed wheels. Thus without flexible intermediate members the one sided axial pressure of the wheels is obviated, so that no pressure bearing is necessary. The axial movability enables the pinions and the wheels to be positioned automatically for even engagement at every torque; and when this engagement is made, which takes place in an instant, no more axial movement takes place. Moreover the use of two axially movable pinions enables double the power to be transmitted with wheel and pinion diameters suitable to normal conditions or with the same power the size and weight of the gear to be reduced.

The accompanying drawing shows diagrammatically an arrangement according to this invention.

The driving engine $a$ drives directly the axially movable herringbone toothed pinion $b$, and at the same time, by means of an inner shaft $d$ led through the hollow shaft of the pinion $b$, a second herringbone toothed pinion $c$ also directly, the pinion $c$ being arranged on the same axis as the pinion $b$. This pinion is also axially movable by connection of the shaft $d$ with a movable coupling $e$. One half of each of the pinions $b$ and $c$ work on an axially movable herringbone gear wheel $f$, and the other half on an also axially movable herringbone gear wheel $g$. The wheels $f$ and $g$ drive in known way two pinions $h$ and $i$ which work both on a large transmission wheel $k$.

The pinions $b$, $c$ can have helical gear teeth or double helical gear teeth, and the teeth of the wheels $f$, $g$ are chosen accordingly. That is to say that the two halves of the one pinion may have their teeth sloping in one direction and the two halves of the other pinion have their teeth sloping in the other direction, instead of the herringbone arrangement of each pinion shown in the drawing.

Because the driving force is transmitted by an axially movable doubled helically geared pinion whose two parts are equally under the direct influence of the driving force, a uniform distribution of the driving power takes place both to the pinions $b$ and $c$ and also to the pinions $h$ and $i$. The pinion $b$ owing to its engagement with the halved teeth of the transmission wheels $f$ and $g$, produces two oppositely directed axial thrusts, which hold the pinion itself balanced and allow the tooth pressure of both halves of the pinion to become equal. Also the axially movable wheels $f$ and $g$ are so disposed between the teeth of the pinions $b$ and $c$ that the tooth pressure of the wheel halves must be the same. A further result of this is that the pinions $b$ and $c$, in spite of possible distortion of the inner shaft $d$, transmit the same power. With equal tooth pressure of the wheels $f$ and $g$, there is also equal tooth pressure for the pinions $h$ and $i$.

Because the torque of the pinion $c$ is transmitted directly and not through the pinion $b$, the pinion $b$ does not suffer a greater alteration in shape than the pinion $c$. Each pinion takes substantially half the torque. A practical result from this is that the pinions can be made substantially thinner than hitherto and thus the wheels *f* and *g* can be made smaller and lighter, or with given measurements a greater transmission ratio can be used or larger power can be transmitted with smaller wheels under good tooth pressure conditions. The pinions *b* and *c* as well as the wheels *f* and *g* are completely free in the axial direction. They neither need a pressure bearing nor do they exert a thrust in one direction on the pinions *h* and *i* of the second transmission. In this way friction losses are avoided. The tooth pressure of the pinions *h* and *i* is also equalized, as mentioned above. Because, moreover, the driving power is equally distributed to both pinions *h* and *i* the large gear wheel *k* need only be made half as broad. The pinions *h* and *i* also can be thinner. Therefore in the same space a larger transmission ratio can be used, or an intermediate bearing for the pinions of the second transmission can be done away with thus resulting in a saving of length. Highly tensioned flexible intermediate shafts are completely avoided.

Furthermore substantial production advantages are obtained because the accurate cutting of teeth of small wheels is easier. The reason for this is that each oblique tooth must be cut without interruption with the same tool, and with a large number of surfaces to be cut the tool tends to become blunt which spoils the accuracy of cutting.

What I claim is:—

1. A power transmission gear comprising two pinions each directly actuated from the power source and each axially movable independently of the other, a wheel having two engagement tracks, one of said tracks being in engagement with one of said pinions and the other of said tracks in engagement with the other pinion, a final transmission pinion driven by said wheel and another wheel connected to the driven element and driven by said final transmission pinion.

2. A power transmission gear comprising two pinions each directly actuated from the power source and each axially movable independently of the other, two wheels each having two engagement tracks, one track of each wheel being in engagement with one of said pinions and the other track of each wheel in engagement with the other pinion, a pair of final transmission pinions each driven by one of said wheels and another wheel connected to the driven element and driven by both final transmission pinions.

3. A power transmission gear comprising two coaxial helically toothed pinions each directly actuated from the power source and each axially movable independently of the other, said pinions each being provided with two sets of oppositely inclined teeth, two wheels each having two helically toothed engagement tracks, one track of each wheel being in engagement with one of said pinions and the other track of each wheel in engagement with the other pinion, the teeth of one track of said wheels sloping in the opposite direction to the teeth of the other track of the same, two final transmission pinions each driven by one of said wheels and another wheel connected to the driven element and driven by both final transmission pinions.

4. A power transmission gear comprising a plurality of helically toothed coaxial tracks, other coaxial tracks in engagement with said coaxial tracks and having helical teeth, certain pairs of coaxial tracks being mounted so as to be capable of free relative axial movement each pair independently of the other, a driving shaft driving the coaxial tracks on one axis and a driven shaft actuated through gearing by the other coaxial tracks.

5. A power transmission gear comprising a plurality of coaxial helically toothed pinions each directly actuated from the power source and each axially movable independently of the other, said pinions each being provided with two sets of oppositely inclined teeth, a plurality of wheels each having a plurality of helically toothed engagement tracks, one track of each wheel being in engagement with one of said pinions and another track of the same being in engagement with another pinion, final transmission pinions each driven by one of said wheels and another wheel connected to the driven element and driven by said final transmission pinions.

6. A power transmission gear comprising two halved coaxial helically toothed pinions, the teeth on one half of each pinion sloping in the opposite direction to the teeth on the other half, said pinions being each directly actuated from the power source and each axially movable independently of the other, two wheels mounted on shafts disposed at exactly opposite sides of the axis of said pinions and parallel thereto, each wheel having two engagement tracks with helical teeth sloping in one direction forming one track and helical teeth sloping in the other direction forming the other track, the tracks of one wheel engaging one half of each pinion and the tracks of the other wheel engaging the other halves of the two pinions, said wheels being axially movable, halved pinions mounted on the wheel shafts with helical teeth sloping in one direction on one half and helical teeth sloping in the other direction on the other half and a halved helically toothed wheel in engagement with both said latter pinions and connected to the driven shaft.

In testimony whereof I have signed my name to this specification.

GABRIEL WEIS.